(12) United States Patent
McCorkle et al.

(10) Patent No.: US 7,502,410 B2
(45) Date of Patent: Mar. 10, 2009

(54) METHOD AND SYSTEM FOR CONTROLLING A NOTCHING MECHANISM

(75) Inventors: John W. McCorkle, Vienna, VA (US); Timothy R. Miller, Arlington, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 602 days.

(21) Appl. No.: 11/239,133

(22) Filed: Sep. 30, 2005

(65) Prior Publication Data

US 2007/0076782 A1    Apr. 5, 2007

(51) Int. Cl.
    H04B 3/46      (2006.01)
    H04B 17/00     (2006.01)
    H04Q 1/20      (2006.01)
(52) U.S. Cl. .................................. 375/224; 455/226.1
(58) Field of Classification Search ............. 343/700 R; 375/224, 227, 285, 346, 351; 455/296, 226.1–226.3, 455/63.1, 63.11, 63.13
    See application file for complete search history.

(56) References Cited

U.S. PATENT DOCUMENTS

| 5,377,223 | A  | * | 12/1994 | Schilling ..................... 375/146 |
| 5,862,173 | A  | * | 1/1999  | Dent .......................... 375/149 |
| 5,960,091 | A  | * | 9/1999  | White et al. .................. 381/98 |
| 6,271,720 | B1 | * | 8/2001  | Sevastopoulos ............. 327/556 |
| 6,397,070 | B1 |   | 5/2002  | Black |
| 6,426,983 | B1 | * | 7/2002  | Rakib et al. .................. 375/346 |
| 6,522,699 | B1 | * | 2/2003  | Anderson et al. ........... 375/295 |
| 6,807,405 | B1 |   | 10/2004 | Jagger et al. |
| 6,810,124 | B1 | * | 10/2004 | White ....................... 381/71.1 |
| 6,976,044 | B1 | * | 12/2005 | Kilani ........................ 708/320 |
| 7,323,955 | B2 | * | 1/2008  | Jachowski .................. 333/204 |
| 2002/0173341 | A1 |   | 11/2002 | Abdelmonem et al. |
| 2003/0142759 | A1 | * | 7/2003  | Anderson et al. ........... 375/298 |
| 2004/0036556 | A1 | * | 2/2004  | Jocher ........................ 333/202 |

OTHER PUBLICATIONS

International Search Report and Written Opinion (Aug. 2007).

* cited by examiner

*Primary Examiner*—Jean B Corrielus

(57) ABSTRACT

A circuit (100) is provided for notching an incoming wireless signal. The circuit comprises: a notching mechanism (110) for receiving an incoming signal and generating a notched signal having reduced power at the notch frequency (320), the notch frequency being adjustable in response to a notching control signal; a signal parameter detector (165, 170, 175, 180, 185) for detecting a signal parameter of the notched signal (325); a controller (155) for receiving the signal parameter and for generating the notching control signal (315), the controller being configured to vary the signal parameter within a notching control signal range (340); and a memory (160) for storing the signal parameter and the notching control signal received from the controller in a notching database (330). The controller is configured to analyze the notching database to determine an optimal notching control signal to achieve a desired level of signal performance (345).

24 Claims, 7 Drawing Sheets

METHOD AND SYSTEM FOR CONTROLLING A NOTCHING MECHANISM

RELATED INVENTIONS

The present invention relates to U.S. patent application No. 11/237,751, entitled "FREQUENCY-NOTCHING ANTENNA," by John W. McCorkle, filed Sep. 29, 2005, now issued as U.S. Pat. No. 7,352,333.

FIELD OF THE INVENTION

The present invention relates in general to wireless networks in which signal notching is used, and more specifically to a circuit and method for controlling the location of an adjustable notch in one or more notching mechanisms.

BACKGROUND OF THE INVENTION

Any wireless network will broadcast its signals over a set frequency spectrum. In the case of narrowband networks, this will be a relatively short frequency spectrum. But the spectrum used for signals will increase as networks move to wideband and ultrawide bandwidth (UWB) broadcasting systems.

One problem that can arise in any network, but which is particularly troublesome in wider bandwidth systems is that of interfering signals. When a network broadcasts over a large spectrum there may be one or more narrowband interfering signals within that broadcast spectrum. Because of this interference, it may be desirable to limit the extent of transmission or reception over those interfering frequencies. In particular, on the reception side it may be desirable to avoid receiving the energy of interfering signals. While on the transmission side it may be desirable, or even mandated by law, to avoid transmitting signals that will interfere with certain narrowband networks.

By way of example, the current rules set forth by the Federal Communications Commission (FCC) allow for UWB networks to transmit in the spectrum from 3.1 to 10.6 GHz. This spectrum includes other signals (e.g., from cell-phone systems, radar, satellite links, altimeters, etc.).

One way to avoid the interfering signals is to include one or more notch filters in the receiver or the transmitter. These filters will reduce a frequency band from the transmitted or received signals, so that the energy transmitted or received over those bands is significantly lowered (depending upon the specific parameters of the notching filters used).

There are many types of notching filters that could be used, such as lumped filters (e.g., LC or twin-T), distributed filters (e.g., cross-coupled interdigital, open stub, or closed stub), or active filters (e.g., stable variable or salen and key), and their type and design are well known in the art.

The particular notching frequencies used for a given device may be constant or variable. For example, if there are known interfering signals that are likely to always be present, or for which transmission interference must always be avoided, a notching device may be pre-programmed to provide a frequency notch at that known notch frequency. However, for intermittent or local interfering signals, there may be no way to predict at what frequencies an interfering signal might be at. In this case it would be desirable to use a tunable notch and to provide a way by which a desired notching frequency should be dynamically chosen.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

This invention is applicable to any wireless network that employs a tunable notch. It is particularly applicable to an ultrawide bandwidth (UWB) network design, though it is equally applicable to other wireless networks.

First Embodiment

Figure 1:
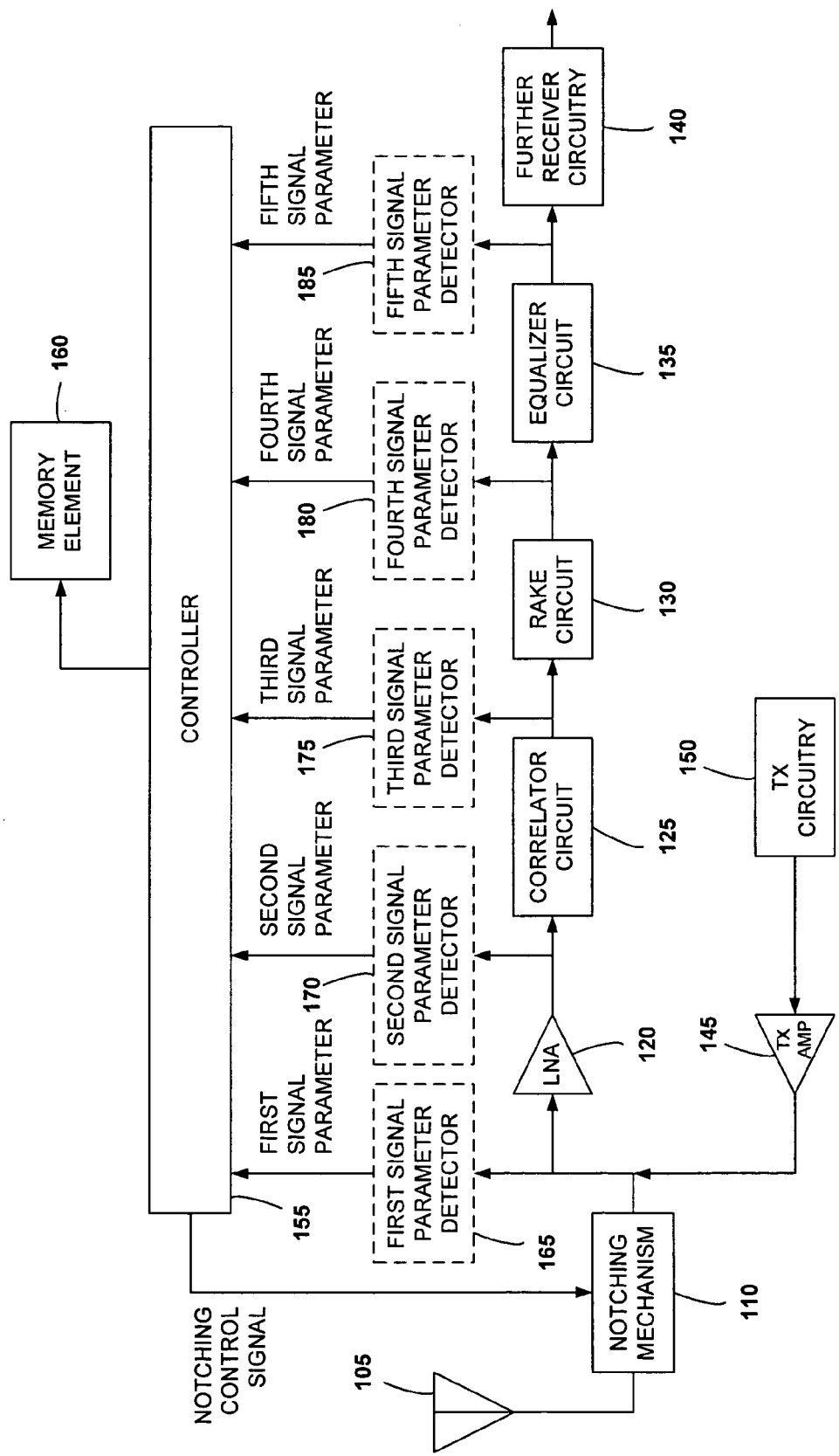
FIG. 1 is a block diagram of a receiver including a notching control circuit, according to a first disclosed embodiment of the present invention.

FIG. 1 is a block diagram of a transceiver including a notching control circuit, according to a first disclosed embodiment of the present invention. As shown in FIG. 1, a transceiver 100 includes an antenna 105, a notching mechanism 110, a low noise amplifier (LNA) 120, a correlator circuit 125, a RAKE circuit 130, an equalizer circuit 135, additional receiver circuitry 140, a transmitter amplifier 145, transmitter circuitry 150, a controller 155, a memory element 160, and one or more of a first signal parameter detector 165, a second signal parameter detector 170, a third signal parameter detector 175, a fourth signal parameter detector 180, and a fifth signal parameter detector 185.

The antenna 105 is configured to transmit and receive signals over a bandwidth used by the transceiver 100. It can be any sort of antenna that is suitable to the type of transceiver 100 used.

The notching mechanism 110 is a notching device whose notching frequency (and possibly other notching parameters) can be changed in response to a notching control signal. It could be a notching filter, an elliptical band pass filter in which the zeroes are controlled, or any suitable device that provides a notching function.

The notching mechanism 110 could be built into the antenna 105 or it could be a separate device. In some embodiments the notching mechanism 110 can include a bypass switch that closes in response to a particular value of the notching control signal, which can bypass the notching circuitry in the notching mechanism 110 and allow a received signal to pass without any notching at all.

One example of a suitable antenna 105 and notching mechanism 110 is shown in U.S. patent application Ser. No. 11/237,751, entitled "FREQUENCY-NOTCHING ANTENNA," by John W. McCorkle, filed Sep. 29, 2005, now issued as U.S. Pat. No. 7,352,333. However, alternate embodiments can use any sort of suitable antenna 105 or notching mechanism 110.

The notching mechanism 110 could also include the ability to provide multiple notches. In this case the notching control signal would provide information regarding notching parameters for all possible frequency notches. In the case of numerous notching parameters, the notching control signal can actually be multiple individual signals.

The LNA 122, the RAKE circuit 125, the equalizer circuit 130, and the additional receiver circuitry 135 represent the receiver path of the transceiver 100. In operation the LNA 120 is configured to amplify received signals; the correlator circuit 125 is configured to correlate received signals with locally-generated signals; the RAKE circuit 130 is configured to perform a raking operation on received signals; the equalizer circuit 135 is configured to equalize received signals; and the additional receiver circuitry 140 includes all further signal processing on the downstream side, including a signal detector, forward error correction circuitry, a de-interleaver, framing circuitry, etc.

However, although the embodiment of FIG. 1 discloses the use of an LNA 120, a correlator circuit 125, a RAKE circuit 130, and an equalizer circuit 135, any of these could be eliminated in alternate embodiments.

The transmitter circuitry 150 represents the circuitry in the transceiver required to prepare a signal for transmission. The transmitter amplifier 145 is configured to amplify a signal for transmission before it is sent to the antenna 105 (via the notching mechanism 110) for transmission.

The first through fifth signal parameter detectors 165, 170, 175, 180, and 185 tap into the receiver path at one or more locations. The first signal parameter detector 165 taps the receiver path after the notching mechanism 110; the second signal parameter detector 170 taps the receiver path after the LNA 120; the third signal parameter detector 175 taps the receiver path after the correlator circuit 125; the fourth signal parameter detector 180 taps the receiver path after the RAKE circuit 130; and the fifth signal parameter detector 185 taps the receiver path after the equalizer circuit 135.

Each of the first through fifth signal parameter detectors 165, 170, 175, 180, and 185 measures one or more signal parameters. These signal parameters could be signal energy, signal-to-noise ratio (SNR), a parameter that is monotonic with signal energy, or a parameter that is monotonic with SNR. Exemplary signal parameter detectors include: a power sensor (which measures signal energy), absolute value circuits (which measure a parameter that is monotonic with signal energy), a squaring circuit (which measure a parameter that is monotonic with signal energy), an SNR detection circuit (which measures SNR), or indirect SNR detection circuit (which measures a parameter that is monotonic with SNR). A description of particular exemplary embodiments for an indirect SNR detection circuit can be found in U.S. patent application Ser. No. 09/685,197, entitled "MODE CONTROLLER FOR SIGNAL ACQUISITION AND TRACKING IN AN ULTRA WIDEBAND COMMUNICATION SYSTEM," by Miller et Al., filed Oct. 2, 2002, now issued as U.S. Pat. No. 6,965,630.

The controller 155 receives the one or more signal parameters (depending upon how many of the first through fifth signal parameter detectors 165, 170, 175, 180, and 185 are included in the transceiver 100). Based on the one or more signal parameters, the controller 155 will then generate the notching control signal, which controls one or more notching parameters (e.g., notch frequency, notch depth, notch width, etc,) of a tunable notch in the notching mechanism 110.

The memory element 160 is configured to store information received from the controller 155. In this embodiment, it is particularly configured to store notching control values along with one or more signal parameters associated with each notching control value. The memory element 160 may be implemented as a set of registers, a random access memory (RAM), or any suitable memory device.

Although not shown, the transceiver 100 could also include some kind of switching circuitry between the notching mechanism 110 and the LNA 125 and transmitter amplifier 180 to switch connections between a transmitting path and a receiving path during transmitting and receiving operations, respectively. In addition, although FIG. 1 discloses a transceiver, it is equally applicable to a simple receiver. In this case, the transmitter amplifier 180 and the transmitter circuitry 185 would be omitted.

In addition, although the notching mechanism 110 is shown as being located between the antenna 105 and both the LNA 120 and the transmitter amplifier 145, in alternate embodiments it can be placed anywhere on the receiver path that is upstream of the signal parameter detector or detectors that are used.

Figure 2:
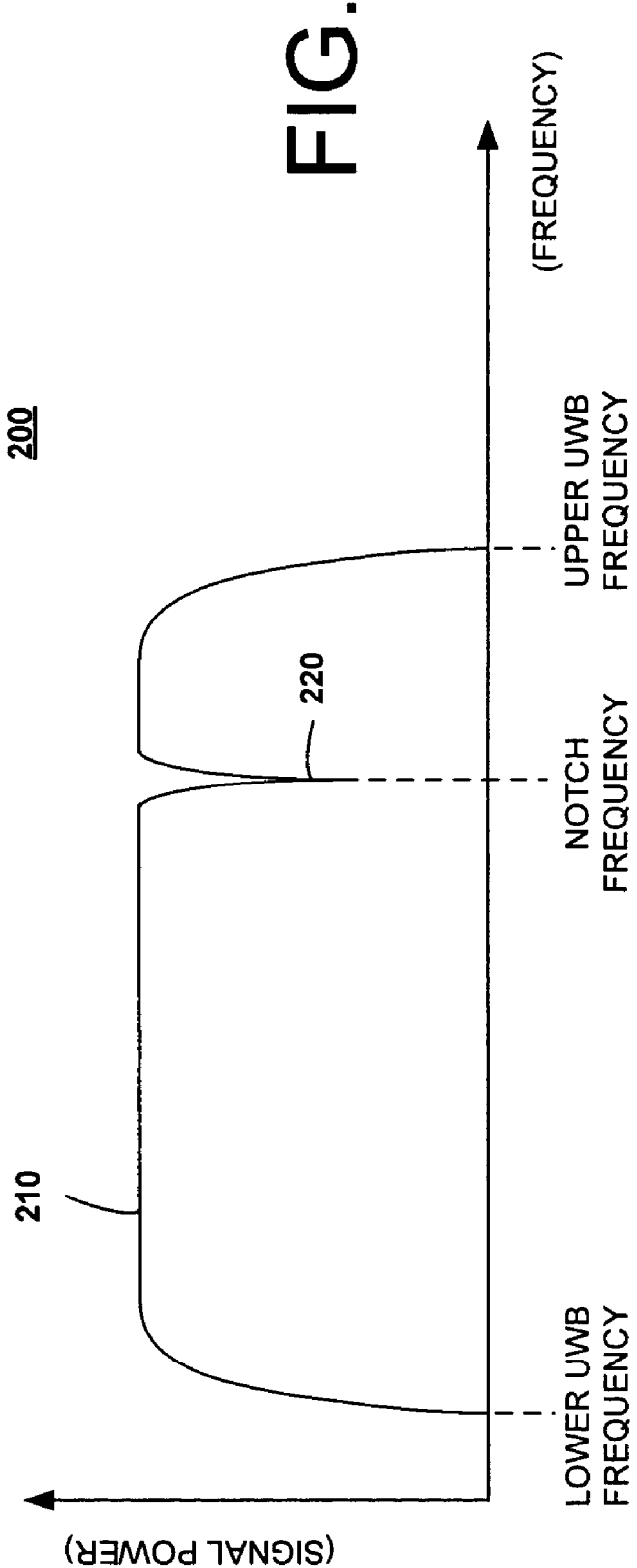
FIG. 2 is a frequency spectrum graph of a signal including a frequency notch, output from the notching mechanism of FIG. 1, according to a disclosed embodiment of the present invention.

FIG. 2 is a frequency spectrum graph of a signal including a frequency notch, output from the notching mechanism of FIG. 1, according to a disclosed embodiment of the present invention. The notch in FIG. 2 is exemplary of the sort of notch that could be provided by the transceiver 100 of FIG. 1 if that transceiver 100 were a UWB transceiver.

As shown in FIG. 2, the incoming signal has a frequency spectrum 210 that covers a frequency from a lower UWB frequency to an upper UWB frequency.

A frequency notch 220 is provided in the frequency spectrum 210 as a result of the operation of the notching mechanism 110. This frequency notch 220 is at a particular notching frequency that can vary throughout the frequency spectrum 210, within the limits of the design of the notching mechanism 110. It may even be located at the far end of the frequency spectrum 210 to minimize its effect on the frequency spectrum 210. The particular notching parameters of the notch (i.e., the notching frequency, width and depth of the notch, etc.) will be controlled by the notching control signal.

Figure 3:
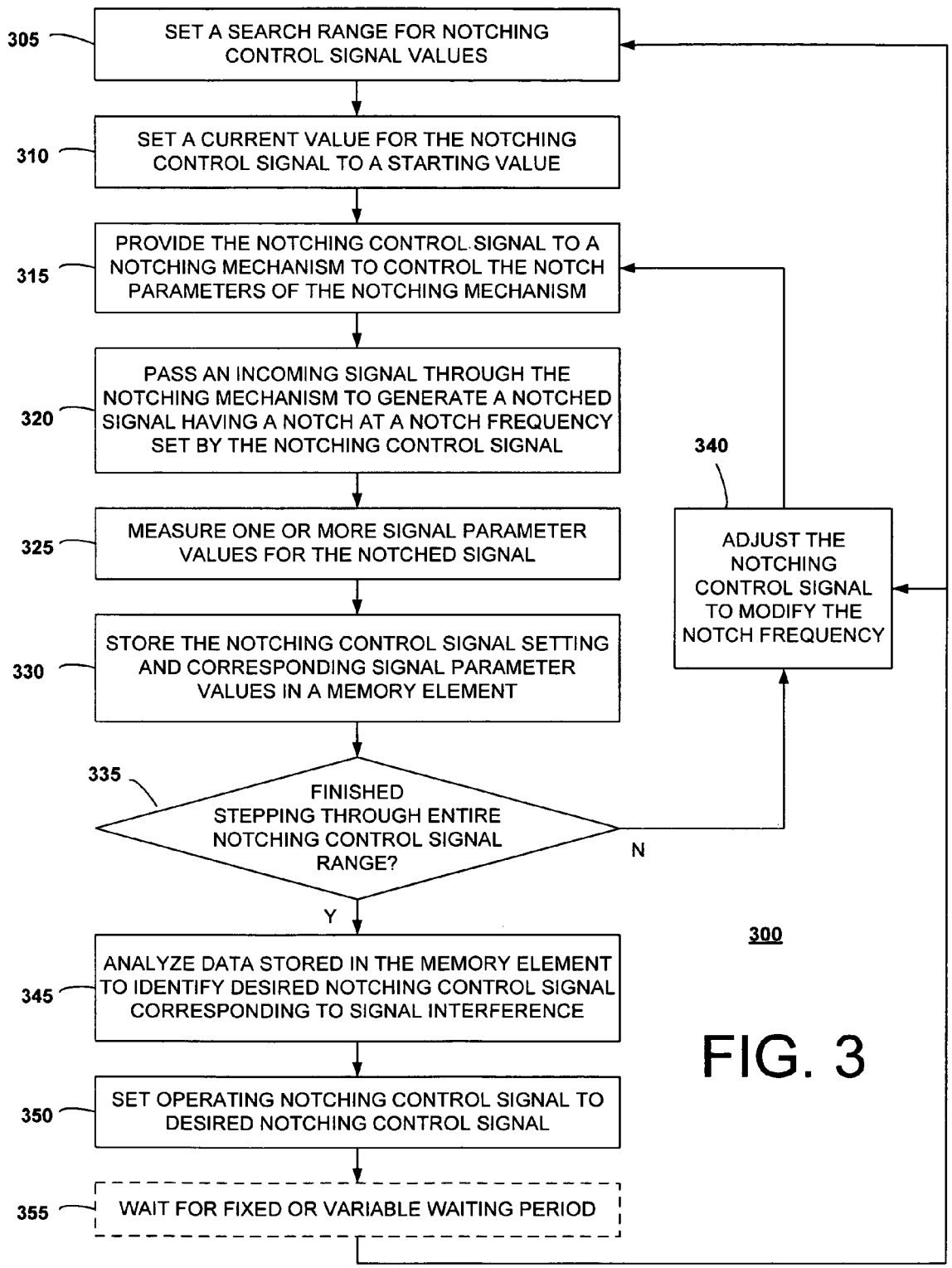
FIG. 3 is a flow chart of a method of controlling notching, according to a disclosed embodiment of the present invention.

FIG. 3 is a flow chart of a method of controlling notching, according to a disclosed embodiment of the present invention. In one embodiment, this method 300 could be performed by the transceiver 100 of FIG. 1, with the controller 155 controlling the operation of the method 300, though it may be performed by other devices in alternate embodiments.

As shown in FIG. 3, this method 300 begins by a device setting a search range for the notching control signal values. (305) This range of notching control signal values corresponds to a set of notching parameters (e.g., notching frequency, notch width, etc.) that the method will search. The search range may be the entire range of possible values for the notching control signal, or a sub-range that only includes a lesser set of possible values. For example, on first testing a device in a given area, the method may test the entire range of possible control signal values. But with some foreknowledge of the area that indicates possible interfering signals (either from previous measurements or stored information), the method may only need to test a smaller range. For example, a device might perform a test on a full range of control signal values upon receiving a first data packet, but would then use information from that first packet to narrow a search range for later packets. Furthermore, the search range might also include a setting where the notch is disabled, or is out of the passband so as to be effectively disabled.

The device then sets a current notching control signal value to a starting value in the search range. (310) In the embodiment disclosed in FIG. 1, this operation would be performed by the controller 155.

The notching control signal is then provided to a notching mechanism 110 to control the notching parameters (e.g., notching frequency, notch width, etc.) for the notching mechanism 110. (315)

The transceiver 100 then receives an incoming signal at an antenna 105 and passes it through the notching mechanism 110 to generate a notched signal having a signal notch at the notching frequency determined by the notching signal. (320)

The device then measures one or more signal parameter values for the notched signal at one or more points in the receiver path. (325) In the embodiment of FIG. 1, this is signal parameter measurement is performed by one or more of the signal parameter detectors 165, 170, 175, 180, and 185.

The current value for the notching control signal is then stored in a memory element along with a corresponding signal parameter or parameters. (330)

The device then determines whether it has stepped through an entire search range of notching control signal values. (335) If it has not stepped through all of the values, then the device sets a current value of the notching control signal to an adjusted value (340) that has not been tested, and provides this new notching control signal to the notching mechanism 110. (320)

The stepping through of the possible values of the notching control signal in the search range can be performed in a linear fashion, incrementing the notching control signal for each pass, or it could be implemented in a more complicated process by which all values are tested. Furthermore, one possible value for the notching control signal may be a value that turns the notching mechanism 110 off, i.e., provides no notch within the frequency range of the notching mechanism 110.

If the device determines that it has stepped through the entire range of possible notching control signal values in the search range (335), it then proceeds to analyze the data stored in the memory element to determine which of the possible notching signal control values provides a desired amount of notching. (345)

The data analysis might be accomplished by looking at a measurement that is monotonic with SNR and finding a notching control signal value that gives a maximum for this measurement. In the alternative it could be accomplished by looking at a measurement that is monotonic with power and determine where the value was at a minimum over the range where the notch was enabled. If there was no clear minimum over the range of possible signal values, the filter could be disabled or effectively disabled.

In some embodiments, where the measurement is noisy, processing can be performed on the stored data to account for noise variations. For example, a smoothing function based on the predicted function that the stored data represents could be used. In this case the method can look for desirable values for the predicted function and pick a desired notching control signal based on that predicted function. For example, the function representing the measured parameter versus the swept notching mechanism will likely be known a priori. Therefore a matched filter can be used on the stored data to predict how the control signal corresponds to the radio performance.

Regardless, the stored parameters are examined to determine which of the evaluated notching control values provides the most desirable set of signal parameters, i.e., the most desirable level of signal quality, based on whatever criteria are most appropriate. And since the data stored in the memory element represents measured signal parameters for actual received signals, this will be an accurate predictor for the operation of the transceiver 100.

In the method of FIG. 3, it is not necessary for the system to ever know the actual notch frequency that the notching mechanism 110 uses. The method simply finds the control signal that puts the notch into the most desirable place. As a result, even if the notch is imprecise, for example, due to manufacturing tolerances, and it is hard to determine exactly what the notching frequency is, this method will still put the notch in the desired place.

In some embodiments an analysis of the stored parameters may indicate that no notching is desirable. In this case the notching mechanism 110 can be instructed to pass a signal without any notching.

Once the device has determined a desired notching signal value (345), it then sets an operating notching control signal value to the desired notching signal value. (350) Once this value is set, the notching mechanism 110 will provide a desired level of notching for both transmitted and received signals.

After the operating notching control signal value is set, the device can use that setting for a set period of time. Then, after some waiting for a fixed or variable waiting period (355), the notch sweep can be repeated (305-350) in case the interference disappears or changes frequency. The waiting period can be controlled dynamically by a processor in the device, or can be set to a fixed duration. For example, a radio processor might program the wait duration to be N packets, or it might wait for a particular quiet time slot in a TDMA protocol.

In an alternate embodiment of notching control method, the device could step through fewer than all of the possible values of the notching control signal, and extrapolate other data values to predict desired notching control signal.

In an embodiment in which a notching mechanism 110 had the ability to provide multiple notches, this process could be performed such that each desired permutation of notch values were tested. Alternatively, it could sequentially find notch settings from most to lesser benefit.

Second Embodiment

Figure 4:
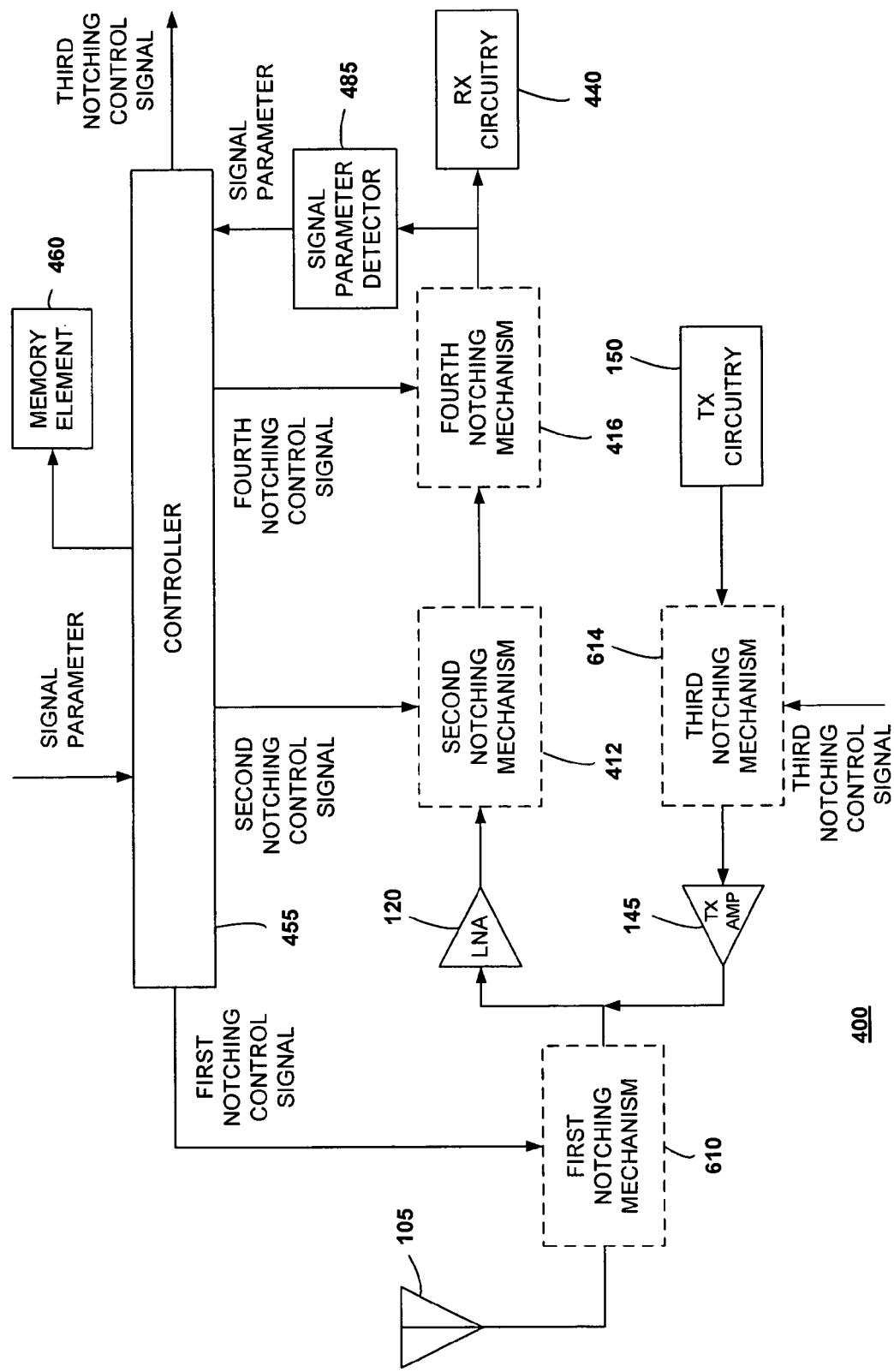
FIG. 4 is a block diagram of a receiver including a notching control circuit, according to a second disclosed embodiment of the present invention.

FIG. 4 is a block diagram of a receiver including a notching control circuit, according to a second disclosed embodiment of the present invention. In this embodiment, multiple notching mechanisms are employed.

As shown in FIG. 4, a transceiver 400 includes an antenna 105, a low noise amplifier (LNA) 120, receiver circuitry 440, a transmitter amplifier 145, transmitter circuitry 150, a controller 455, a memory element 460, a signal parameter detector 485, and two or more of a first notching mechanism 410, a second notching mechanism 412, a third notching mechanism 414, and a fourth notching mechanism 416.

The antenna 105, LNA 120, transmitter amplifier 145, and transmitter circuitry 150 operate as described above with respect to FIG. 1. The receiver circuitry 440 includes all of the signal processing on the receiver path downstream of the LNA 120. This could include correlators, RAKE, equalizers, etc.

The first notching mechanism 410 is placed between the antenna 105 and both the LNA 120 and the transmitter amplifier 145. As such, it notches signals in both the receiving path and the transmitting path. The second and third notching mechanisms 412 and 414 are placed between the LNA and the receiver circuitry 440. As such, they notch signals in only the receiving path. The fourth notching mechanism 416 is placed between the transmitter amplifier 145 and the transmitter circuitry 150. As such, it notches signals in the transmitting path. By using two or more of the first through fourth notching mechanisms 410, 412, 414, and 416, the transceiver to provide a more nuanced approach to notching, allowing some notches to be only for transmitting, some only for receiving, and some for both. It can also provide larger notches by setting multiple notching mechanisms to the same notching frequency.

The signal parameter detector 485 taps into the receiver path at a set point downstream of all of the notching mechanisms that should be examined and measures one or more signal parameters. These signal parameters could be signal energy, signal-to-noise ratio (SNR), a parameter that is monotonic with signal energy, or a parameter that is monotonic with SNR, as described above with reference to FIG. 1. In alternate embodiments multiple signal parameter detectors could be used, in a manner similar to that described above with respect to the embodiment of FIG. 1.

The controller 455 receives the one or more signal parameters, and, based on the one or more signal parameters, will generate one or more notching control signals based on how many of the notching mechanisms 410, 412, 414, and 416 are contained in the transceiver 400. Each of the notching control signals (i.e., first, second, third, and fourth notching control signals) controls the location of a tunable notch in a corresponding one of the first through fourth notching mechanisms 410, 412, 414, and 416.

The memory element 460 is configured to store information received from the controller 455. In this embodiment, it is specifically configured to store a set of notching control signal values for each of the notching mechanisms contained in the receiver path (i.e., whichever of the first, second, and fourth notching elements 410, 412, and 414 are included in the transceiver 400) along with the one or more signal parameters associated with each set of notching control values. The memory element 460 may be implemented in a manner similar to the memory element 160 of FIG. 1.

The process described above with respect to FIG. 3 can be performed on the transceiver 400 of FIG. 4, with data being stored about all of the notching mechanisms in use in the receiving path (i.e., the first, second, and fourth notching mechanisms 410, 412, and 416). This data can then be used to predict one or more places where notching would be desired. By controlling the first through fourth notching control signals, the same or different notches can then be provided each of the notching control mechanisms 410, 412, 414, and 416 that are present. For example, different notches could be provided for the transmitting side and the receiving side by instructing the second and third notching elements 412 and 414 to have different notching frequencies (or instructing one of the notching elements 412 and 414 to be shut off). Similarly, multiple notches could be provided on the receiving side (or the transmitting side, if multiple notching elements were used there) by instructing the second and fourth notching elements 412 and 416 to have different notching frequencies.

In addition, a deeper notch could be provided in some embodiments than would be practical for a single notching mechanism, by instructing two of the notching mechanisms in the same path (e.g., a first notching mechanism 410 and a second notching mechanism 412) to have the same notching frequency. For example, if a 20 dB notch is easily provided, but a 40 dB notch is either too difficult to design or unacceptably complex or expensive, two 20 dB notches could be employed as the first and second notching mechanisms 410 and 412, and the two could be set to have the same notching frequency to achieve the desired 40 dB level of notching. Additional notching mechanisms could be used to further increase the amount of notching.

Although the third notching mechanism 414 will not influence the parameters measured at the signal parameter detector 485, the third notching control signal can be set based on the results of the analysis of the other notching mechanisms 410, 412, and/or 416 in the receiving path.

Third Embodiment

Figure 5:
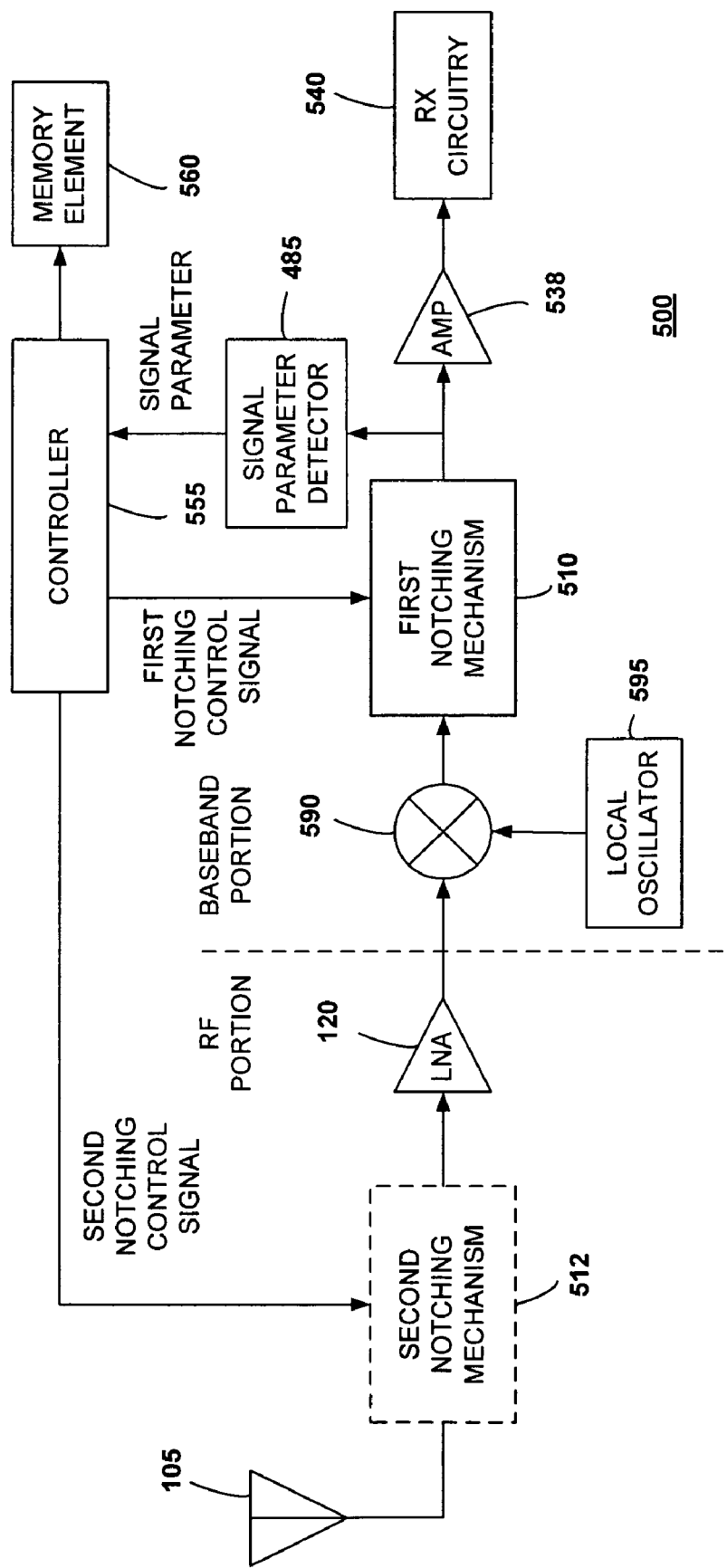
FIG. 5 is a block diagram of a receiver including a notching control circuit, according to a third disclosed embodiment of the present invention.

FIG. 5 is a block diagram of a receiver including a notching control circuit, according to a third disclosed embodiment of the present invention. In this embodiment, two notching mechanisms are used at different parts of a circuit such that there is not a direct correspondence of their notching controls signals and their notching frequencies.

As shown in FIG. 5, a receiver 500 includes an antenna 105, a first notching mechanism 510, a low noise amplifier (LNA) 120, a receiver amplifier 538, receiver circuitry 540, a controller 555, a memory element 560, a signal parameter detector 485, a mixer 590, and a local oscillator 595, and may include a second notching mechanism 512.

The antenna 105 and the LNA 120 both operate as described above with respect to FIG. 1.

The first notching mechanism 510 is placed between the mixer 590 and the receiver amplifier 538 and notches signals in a baseband portion of the receiver path. The second notching mechanism 512, if it is included, is placed between the antenna 105 and the LNA 120, and notches signals in a radio frequency (RF) portion of the receiver path.

The mixer 590 is placed between the LNA 120 and the second notching mechanism, and mixes the received signal in a baseband portion of the receiver path with a locally-generated signal provided by the local oscillator 595. The receiver amplifier 538 serves to amplify the received signal in the baseband portion of the receiver path. The signal parameter detector 485 operates as described above with respect to FIG. 4. The receiver circuitry 540 includes all of the signal processing on the receiver path downstream of the receiver amplifier 538. This could include correlators, RAKE, equalizers, etc.

The controller 555 receives the one or more signal parameters, and, based on the one or more signal parameters generates first and second notching control signals (as needed) to control the operation of the first and second notching mechanisms 510 and 512.

The memory element 560 is configured to store information received from the controller 555. In this embodiment, it is particularly configured to store a set of notching control signal values for the first notching mechanism 510, and the second notching mechanism 512, if it is included, along with the one or more signal parameters associated with each set of notching control values. The memory element 560 may be implemented in a manner similar to the memory element 160 of FIG. 1. In some embodiments, however, one of the first and second control signals will be derived from the other. In this case, only the base control signal value need be stored.

As shown in FIG. 5, the signal received at the first notching mechanism 510 is in the baseband portion of the receiver path, after the received signal has been mixed in the mixer 590 with the local signal generated by a local oscillator 595. As a result of this, the energy of the signal is shifted to a baseband frequency, with each half of the RF frequency spectrum 210 shown in FIG. 2 being folded into the baseband frequency range.

Figure 6:
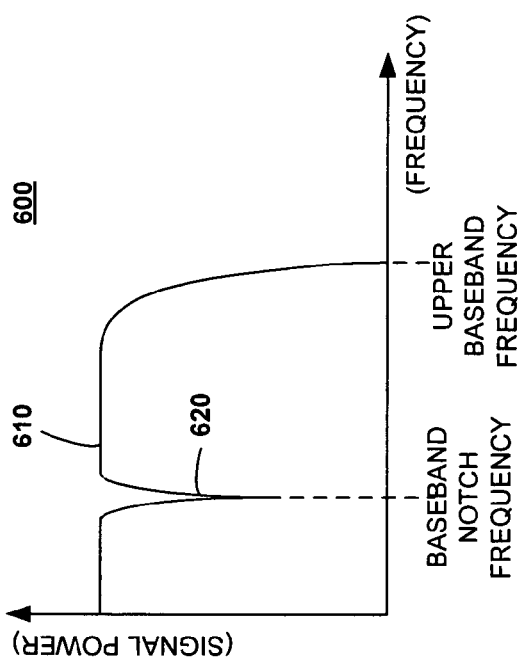
FIG. 6 is a graph of a baseband frequency spectrum of a signal output from the first notching mechanism of FIG. 5, according to a disclosed embodiment of the present invention.

FIG. 6 is a graph of a baseband frequency spectrum of a signal output from the first notching mechanism of FIG. 5, according to a disclosed embodiment of the present invention. In this embodiment, there is no second notching mechanism 512. As shown in FIG. 6, after conversion to the baseband portion, the received signal has a frequency spectrum 610 ranging from zero to an upper baseband frequency. The low frequencies of the RF spectrum 210 are flipped to range from zero to the upper baseband frequency, and the high frequencies of the RF spectrum 210 are overlapped on the same frequency range. Generally, the upper baseband frequency will be much lower than the lower UWB frequency. For example, the upper baseband frequency might be around 800 MHz, where the lower UWB frequency might be around 3 GHz.

When the first notching mechanism 510 performs its notching operation in the baseband, it will create a baseband notch 620 at a complex baseband notch frequency between zero and the upper baseband frequency. However, because the RF is folded, the single baseband notch will be reflected to both the upper and lower halves of the RF frequency spectrum, creating two notches 720 and 730, shown in FIG. 7.

Figure 7:
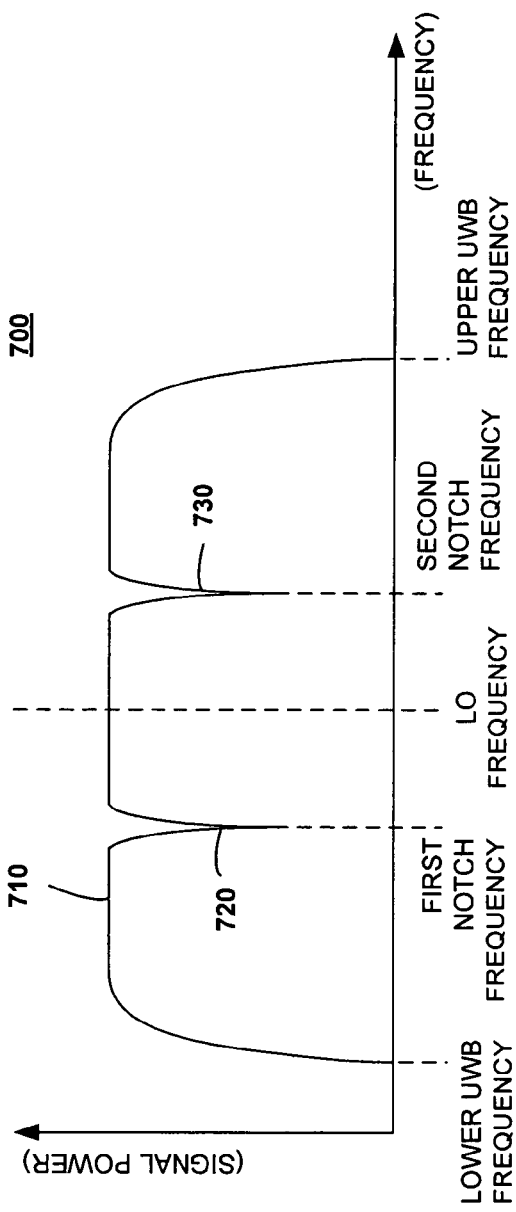
FIG. 7 is a graph of an RF spectrum for a received signal notched in the baseband portion of the receiver path of in FIG. 5, according to a disclosed embodiment of the present invention.

FIG. 7 is a graph of an RF spectrum for a received signal notched in the baseband portion of the receiver path of in FIG. 5, according to a disclosed embodiment of the present invention. As shown in FIG. 7, the resulting frequency spectrum 710 after baseband notching is to have the baseband notch duplicated so as to cause a first notch 720 at a first notch frequency below the LO frequency and a second notch 730 at a second notch frequency at a corresponding point above the LO frequency.

Using the second notching mechanism 512 in FIG. 5 in the RF portion of the receiver path will create just a single notch at a single desired notch frequency, while using first notching mechanism 510 in the baseband portion of the receiver path will always create a double notch. Thus, the second notching mechanism 512 provides some advantage over the first notching mechanism 510, since it can generate a single notch.

However, the second notching mechanism 512 must operate at the RF frequencies, which can be very high frequencies in some embodiments, while the first notching mechanism 510 can operate at the baseband frequencies, which are generally much smaller. This can make the implementation of the first notching mechanism 510 simpler and cheaper than the implementation of the second notching mechanism 512. Active state variable filters can be implemented in IC processes like low-cost CMOS or high performance GaAs, for example.

Thus, each of the first and second notching mechanisms 510 and 512 provide their own advantages and drawbacks. It may therefore be desirable to include both types of notching mechanism in a single transceiver to maximize the advantages of the transceiver's notching in general.

If two separate notching mechanisms are used (i.e., the first and second notching mechanisms 510 and 512), they may be created using different implementations, which will in turn require that they receive different control signals. For example, in the embodiment of FIG. 5, the first notching mechanism 510 is in the baseband portion of the receiver path and may require a digital first control signal, while the second notching mechanism 512 is in the RF portion of the receiver path and may require an analog second control signal. As a result, the control signals used to control the notching mechanisms 510 and 512 will each have a different correspondence between control signal and notching parameters.

In other words, the same signal cannot control both notching mechanisms 510 and 512 in the same way. As a result, even if the same notching parameters are desired for the two notching mechanisms 510 and 512, it is necessary to generate two different control signals as the first and second notching control signals. And if the same notching parameters are desired, it is necessary to make certain that these two control signals result in the same notching parameters in the first and second notching mechanisms 510 and 512.

Figure 8:
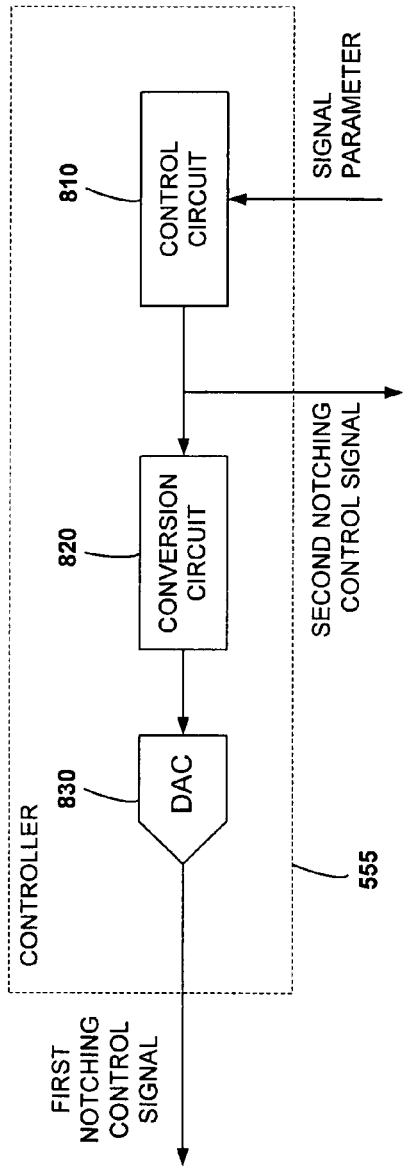
FIG. 8 is a block diagram of the controller of FIG. 5, according to a disclosed embodiment of the present invention.

One possible way to accomplish the coordination of control signals is through the controller 555 that converts one signal type into the other. FIG. 8 is a block diagram of the controller of FIG. 5, according to a disclosed embodiment of the present invention. As shown in FIG. 8, the controller 555 includes a control circuit 810, a conversion circuit 820, and a digital-to-analog converter (DAC) 830.

The control circuit 810 accepts the signal parameter and performs all the functions of the controllers 155 and 455 of FIGS. 1 and 4. In this embodiment, however, rather than outputting two separate signals for the first and second notching control signals, it only outputs a single control signal (i.e., the second notching control signal in this embodiment).

The conversion circuit 820 receives the second notching signal and outputs a corresponding first notching signal that would control the first notching mechanism 510 in the same manner as the corresponding second notching control signal will control the second notching circuit 512, i.e., the first and second notching mechanisms 510 and 512 will operate using the same notching parameters when they receive corresponding first and second notching control signals.

The conversion circuit 820 could be a look-up-table that stores the corresponding control signal values needed for the first and second notching control signals, or it could be a computational block that performs a conversion function between the first and second control signals. The data for the look-up-table or the function for the computational block can be determined by analyzing the notching operation of the first and second notching mechanisms 510 and 512 with a vector network analyzer based on different input signals.

If a look-up-table were used as the conversion circuit 820, this data could be stored directly in the look-up-table. In addition, a least squares curve fit could be done on the data to generate a polynomial to describe the operation of the notching mechanism. This polynomial could be used to generate additional data for a look-up-table or to model the operation of a computational block. And since the physical properties of the first and second notching mechanisms 510 and 512 won't change, this only needs to be done once for a single transceiver design. Alternate ways of gathering data or modeling the operation of the notching mechanism could be employed and would be known to one skilled in the art.

The DAC 830 converts the digital output of the conversion circuit 820 into an analog first notching control signal appropriate for use by the first notching mechanism 510 in the RF portion of the receiver path. In embodiments in which no digital-to-analog conversion is required, the DAC 830 can be omitted.

Figure 9:
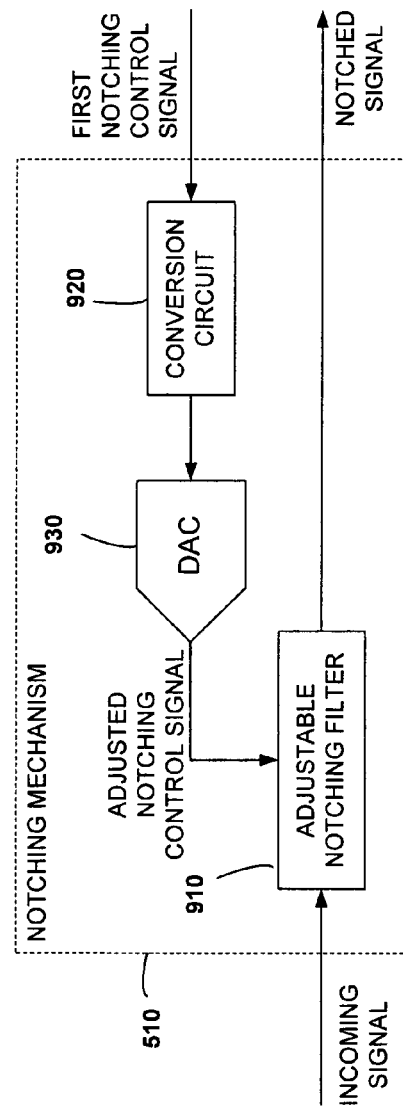
FIG. 9 is a block diagram of the first notching mechanism of FIG. 5, according to a disclosed embodiment of the present invention.

Another possible way to accomplish the coordination of control signals is to have one of the notching mechanisms convert one signal type into the other. FIG. 9 is a block diagram of the first notching mechanism of FIG. 5, according to a disclosed embodiment of the present invention. As shown in FIG. 9, the first notching mechanism 510 includes an adjustable notching filter 910, a conversion circuit 920, and a digital-to-analog converter (DAC) 930.

The conversion circuit 920 and the DAC 930 operate in a manner similar to that of the conversion circuit 820 and DAC 830 in FIG. 8. In this embodiment the functionality of these two elements is contained in the first notching mechanism 510 rather than the controller 555. As a result, in this embodiment, the controller 555 provides the same signal as both the first and second notching control signals. The second notching control signal is used to control the operation of the second notching mechanism 512, while the first notching control signal is converted by the conversion circuit 920 and the DAC 930 into an adjusted notching control signal.

The adjustable notching filter 910 then creates a frequency notch on an incoming signal to generate a notched signal in response to the adjusted notching control signal.

With respect to FIGS. 5, 8, and 9, in the case of multiple devices requiring different signals, the controller could contain multiple conversion circuits, or a single conversion circuit with multiple output signals, or conversion circuits could be provided in as many notching mechanisms as needed. Proper DACs or analog-to-digital converters (ADCs) can be provided as needed for signal conversion.

Although the controller 555 and the first notching mechanism 510 in FIGS. 8 and 9 are disclosed with reference to FIG. 5, they would be equally applicable to the embodiment of FIG. 4 in the cases in which two notching mechanisms required different signal types to achieve the same notching parameters.

In addition, although the embodiment of FIG. 5 discloses only a receiver, it would be equally applicable to a transceiver, in a manner similar to that of the embodiments of FIGS. 1 and 4 above.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of controlling a notching mechanism in a wireless receiver, comprising:
   setting a current value of a notching control signal to a new value;
   providing the notching control signal to the notching mechanism in order to control a notch frequency of the notching mechanism;
   passing an incoming signal through the notching mechanism to generate a notched signal having a notch at the notch frequency;
   measuring a current value of a signal parameter for the notched signal;
   storing the current value of the notching control signal and the current value of the signal parameter in a notching database in a memory device;
   repeating the setting of the current value of the notching control signal, providing the notching control signal to the notching mechanism, measuring the current value of the signal parameter, and storing the current value of the notching control signal and the current value of the signal parameter, until the current value of the notching control signal has passed through a set control signal range of values;
   analyzing the notching database to select one of the notching control signal values that corresponds to a desired level of signal performance; and
   setting an operating value of the notching control signal to the selected notching control signal value.

2. A method of controlling a notching mechanism, as recited in claim 1, further comprising:
   waiting for a waiting period;
   repeating the steps of providing the notching control signal to the notching mechanism, passing the incoming signal through the notching mechanism, measuring the current value of the signal parameter, storing the current value of the notching control signal and the current value of the signal parameter, repeating the setting of the current value of the notching control signal, providing the notching control signal to the notching mechanism, measuring the current value of the signal parameter, and storing the current value of the notching control signal and the current value of the signal parameter, and analyzing the notching database, and setting an operating value of the notching control signal, after the waiting period.

3. A method of controlling a notching mechanism, as recited in claim 1, wherein the analyzing of the notching database further comprises one of:
  searching the notching database to find a signal parameter that indicates a minimum signal energy and selecting a corresponding notching control signal value,
  searching the notching database to find a signal parameter that indicates a maximum signal-to-noise ratio and selecting a corresponding notching control signal value, and
  searching the notching database and selecting a null notching control signal value that indicated no notching is needed.

4. A method of controlling a notching mechanism, as recited in claim 1, wherein the signal parameter is one of: signal strength, a first parameter monotonically associated with signal strength, a signal-to-noise ratio, and a second parameter monotonically associated with signal-to-noise ratio.

5. A method of controlling a notching mechanism, as recited in claim 1, wherein the notching mechanism is one of: a notch filter, or an elliptical band pass filter.

6. A method of controlling a notching mechanism, as recited in claim 1, wherein the notching mechanism is contained on an antenna.

7. A method of controlling a notching mechanism, as recited in claim 1, wherein the method is implemented in an ultrawide bandwidth devices.

8. A method of controlling a notching mechanism, as recited in claim 1, wherein the method is implemented via a device formed on an integrated circuit.

9. A method of controlling a notching mechanism, as recited in claim 1, wherein the notching mechanism is in one of: a radio-frequency portion of a receiver path, or a bandpass portion of a receiver path.

10. A circuit for notching an incoming wireless signal, comprising:
  a notching mechanism for receiving the incoming wireless signal and generating a notched signal having reduced power at a notch frequency, the notch frequency being adjusted in response to a notching control signal;
  a signal parameter detector for detecting a signal parameter of the notched signal;
  a controller for receiving the signal parameter and for generating the notching control signal, the controller being configured to vary the signal parameter within a notching control signal range; and
  a memory for storing the signal parameter and the notching control signal received from the controller in a notching database.

11. A circuit for notching an incoming wireless signal, as recited in claim 10, wherein the controller is configured to analyze the notching database to determine an optimal notching control signal to achieve a desired level of signal performance.

12. A circuit for notching an incoming wireless signal, as recited in claim 10, wherein the signal parameter is one of: signal strength, a first parameter monotonically associated with signal strength, a signal-to-noise ratio, and a second parameter monotonically associated with signal-to-noise ratio.

13. A circuit for notching an incoming wireless signal, as recited in claim 10, wherein the notching mechanism comprises one of: a notch filter, and an elliptical band pass filter.

14. A circuit for notching an incoming wireless signal, as recited in claim 10, wherein the notching mechanism is contained on an antenna.

15. A circuit for notching an incoming wireless signal, as recited in claim 10, wherein the circuit is implemented in an ultrawide bandwidth device.

16. A circuit for notching an incoming wireless signal, as recited in claim 10, wherein the circuit is implemented on an integrated circuit.

17. A circuit for notching an incoming wireless signal, comprising:
  a first notching mechanism located in a radio frequency portion of the circuit for receiving the incoming wireless signal and generating a first notched signal having a first notch at a first notch frequency, the first notch frequency being adjusted in response to a first notching control signal;
  a second notching mechanism located in a baseband portion of the circuit for receiving the first notched signal and generating a second notched signal having a second notch at a second notch frequency, the second notch frequency being adjusted in response to a second notching control signal;
  a signal parameter detector for detecting a signal parameter of the second notched signal;
  a controller for receiving the signal parameter and for generating the first and second notching control signal, the controller being configured to vary the signal parameter within a notching control signal range; and
  a memory for storing the signal parameter and the first notching control signal received from the controller in a notching database control.

18. A circuit for notching an incoming wireless signal, as recited in claim 17,
  wherein the controller futher comprises a conversion circuit for receiving the first notching control signal and generating the second notching control signal, such that the first and second notching frequencies are substantially the same for corresponding values of the first and second notching control signals.

19. A circuit for notching an incoming wireless signal, as recited in claim 18, wherein the conversion circuit is one of a look-up table or a computational element.

20. A circuit for notching an incoming wireless signal, as recited in claim 17,
  wherein the first and the second control signals are identical, and
  wherein the second notching mechanism further comprises a conversion circuit for receiving the second notching control signal and generating an adjusted notching control signal, such that the first and second notching frequencies are substantially the same for corresponding values of the second notching control signal and the adjusted notching control signal.

21. A circuit for notching an incoming wireless signal, as recited in claim 20, wherein the conversion circuit is one of a look-up table or a computational element.

22. A circuit for notching an incoming wireless signal, as recited in claim 17, wherein the first notching mechanism is contained on an antenna.

23. A circuit for notching an incoming wireless signal, as recited in claim 17, wherein the circuit is implemented in an ultrawide bandwidth device.

24. A circuit for notching an incoming wireless signal, as recited in claim 17, wherein the circuit is implemented on an integrated circuit.

* * * * *